Feb. 21, 1956  E. F. MACKS  2,735,290
WEAR TESTING DEVICE
Filed Nov. 6, 1952
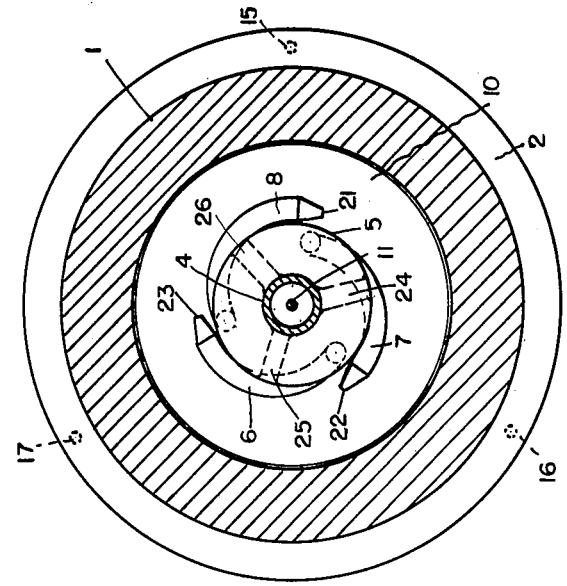
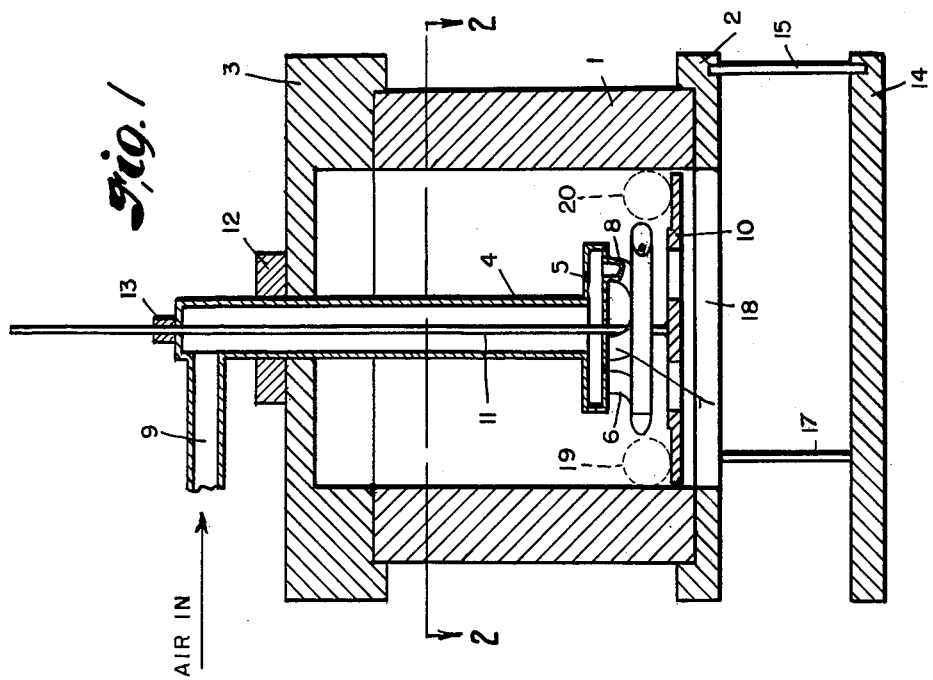
INVENTOR.
E. FRED MACKS
BY
Robert A. Sturges
ATTORNEY

# United States Patent Office 2,735,290
Patented Feb. 21, 1956

2,735,290

WEAR TESTING DEVICE

Elmer Fred Macks, Parkview, Ohio

Application November 6, 1952, Serial No. 319,055

8 Claims. (Cl. 73—7)

This invention relates, as indicated, to a novel testing device which, among other capabilities, is particularly adapted to the determination of fatigue in various materials, especially in metals.

Fatigue characteristics of various materials are but little understood, although it is known that fatigue of metals is an important factor in the life of metal objects subjected to repeated or cyclic stresses and strains. Information concerning metal fatigue characteristics is sparse principally because of the extreme length of time required to test a specimen to the point where failure occurs, the cost, lack of correlation among sets of data, etc. The number of cycles required to give indicative results is in most cases extremely high. With certain ferrous metals it has been generally believed that the endurance limit can be established on the basis of six to ten millions of cycles. In the case of certain non-ferrous metals a much larger number of cycles is necessary, even as high as 50 millions of cycles; and with metals such as Duralumin, copper and brass, no positive results are obtained even after 200 to 400 millions of cycles. This does not mean that such alloys and elements have no endurance limit, but merely that it has not been definitely established.

The popular method for testing rolling contact bearing alloys for endurance is to test the complete bearing in a full scale testing device. As indicated, the time is prohibitive. Results when obtained are usually dispersed where attempts are made to test a single variable necessitating, in many cases, 50 to 100 replications. There are many variables of significance, large and expensive equipment is required, etc. and these few of the many difficulties have contributed to the fact that after thirty years of testing by the largest bearing companies in the world, agreement has not been reached for endurance ratings based on the single variable; namely, the conventional SAE 52100 chrome alloy bearing steel.

It is a primary purpose of this invention, therefore, to provide a testing machine which permits accelerated endurance testing of materials, not only metals, or material combinations under a wide variety of conditions which may be individually controlled, or made to simulate closely the conditions obtaining under actual use. For example, combined compressive stress, sub-surface shear stress, and surface tangential stress are essentially those stresses which occur at the rolling element and raceway contact surfaces of ball bearings and are duplicated with the testing machine of this invention.

Another object of this invention is to provide a testing device which will permit fundamental research work to be done on endurance characteristics of materials of construction and on rolling friction.

Still another object of this invention is to provide a testing device which may be used in testing lubricants of various kinds, especially those which are to be used in environments where rolling friction obtains.

Still another object is to provide a testing device to enable the study of corrosion of metals under conditions of high loading and high speed.

Another object of this invention is to provide a testing device which enables close control of controlled variables.

Other objects of this invention will appear as the description proceeds.

To the accomplishment of the foregoing and related ends said invention, then, consists of the means hereinafter fully described and particularly pointed out in the appended claims, the following description and the annexed drawings setting forth in detail certain illustrative embodiments of the invention, such disclosed means constituting, however, but a few of the various forms in which the principle of this invention may be employed.

In the annexed drawings:

Fig. 1 is a vertical assembly section of a testing device of this invention.

Fig. 2 is a horizontal assembly section through 2—2 of Fig. 1.

It has been found that two or more rolling elements rotated at such high speed that they are self-sustaining within a raceway which is so mounted as to provide dynamic equilibrium in the absence of complicating extraneous forces will enable fatigue or endurance data to be determined quickly and reliably. Standards of comparison can be established and used as a basis for the establishment of specifications. At the end-point, the dynamic equilibrium is destroyed and detectable vibration occurs.

Broadly stated, therefore, this invention is in the provision of a testing device for determining the fatigue or endurance characteristics of solid materials comprising a closed raceway resiliently mounted on a base, a plurality of rolling elements disposed within said raceway, and at least one gaseous fluid inlet port supplied by fluid feeding and pressurizing means for propelling said rolling elements in rolling contact with said raceway. More specifically, this invention is in the provision of a testing device comprising a circular raceway resiliently mounted on a base, from two to four balls of substantially equal weight disposed within said raceway, a cover for the upper portion of said raceway having through the central portion thereof a conduit terminating at its lower end in a manifold from which depend a plurality of nozzles, the exits of which are in a substantially horizontal plane at points substantially equidistant from the center of the raceway and formed to direct jets of gaseous fluid at high speed outwardly from the center toward said raceway in a horizontal substantially tangential direction, gaseous fluid feeding and pressurizing means connecting with said conduit for propelling said balls in rolling contact with said raceway, support means for holding said balls within said raceway when at rest, and an exit below said raceway to permit escape of spent gaseous fluid.

Referring more particularly to Fig. 1, there is shown a raceway 1 mounted on a base 2 and provided with a removable cover 3. Extending downwardly through the cover 3 is a gaseous fluid inlet conduit 4 terminating at its lower end in a manifold 5 from which depend nozzles 6, 7 and 8 through which a gaseous fluid, e. g. air, hydrogen, nitrogen, etc., may be forced under pressure having entered the inlet conduit 4 through the nipple 9 at the upper end thereof and supplied by fluid feeding and pressurizing means, not shown, such as a compressed air cylinder or a compressor. In the embodiment shown in Fig. 1, there is also illustrated a support means or bottom plate 10 attached to the lower end of an adjusting rod 11 passing approximately along the center-line of the inlet conduit 4 and extending through the upper end of the inlet conduit 4. The vertical position of the support 10 may be set and fixed at any desired level within the raceway 1, as may the vertical position of the nozzles 6, 7 and 8. Thus, in a preferred embodiment, the inlet conduit 4 carrying nozzles 6, 7 and 8, which produce jets or gas propelling streams, is desirably, though not necessarily, frictionally and adjustably retained by suitable means as, for example, a collet 12; and the rod 11 is, desirably, though not necessarily, frictionally and adjustably retained by suitable means as, for example, a collet 13. In the preferred embodiment shown, the exits 21, 22, and 23 of the nozzles 6, 7 and 8 lie in a substantially horizontal plane and preferably direct the propelling jets therefrom in a non-radial direction, and most desirably in a direction which is more nearly tangential to the inner surface of the raceway 1.

The assembly as thus far described must be resiliently mounted since some rotational translation is essential to the establishment of dynamic equilibrium. This may be accomplished, as shown in Fig. 1, by mounting the test device on a base plate 14 and spaced therefrom by resilient means, such as, "toothpick" springs 15 and 17. Other resilient means, such as, gum or sponge rubber, or the equivalent of such may replace the springs 15 and 17 shown in Fig. 1. (Note: See Fig. 2 for location of three "toothpick" springs 15, 16 and 17 which are spaced at 120° intervals.) Springy mounting means need not be provided to insure that the rolling elements become established in dynamic equilibrium if the test device is located "loosely" in the horizontal plane as, for example by placing the test device on loosely fitting dowel pins. The resiliency with which the operation of this device is primarily concerned is that occurring in a horizontal plane. For example, the device may be mounted such that there is no motion permitted in a vertical plane and as long as motion in a horizontal plane of even a very small magnitude is permitted, dynamic equilibrium may be achieved. Of course, resiliency in a vertical plane is not prohibited. Thus, the term "resilient means" as used herein will be understood as including any method of mounting which will permit at least a slight motion in a plane parallel to the plane of rolling element rotation. In selecting a resilient mounting means for the device some attention should be given to the "spring constant" thereof as it is clear to those skilled in the art that for a given mass undergoing rotational translation, the lower the spring constant, the lower will be the critical frequency of the test device. Some attention should also be given to the damping constant of the resilient mounting means as the larger the damping constant the smoother the unit will pass through the critical frequencies as the speed of rotation is increased or decreased.

The opening 18 in the base 2 is provided to permit escape of spent gaseous fluid from the apparatus, although manifold escape means may be provided if desired. Alternatively, exit means may be provided at the top of the raceway, in the cover, or at both ends of the test device should the test device be mounted so that the plane of the nozzles is in the vertical rather than the horizontal plane.

There are also shown in Fig. 1 in dotted outline two balls 19 and 20 which represent the rolling elements. Clearance is provided between the rolling elements 19 and 20 and the exits of the nozzles 6, 7 and 8. The plane of the exits 21, 22 and 23 of the nozzles 6, 7 and 8 under operating conditions is desirably essentially horizontal, although jets directed downwardly or upwardly may be used to propel the rolling elements about the raceway.

Fig. 2 is a horizontal assembly section through 2—2 of Fig. 1, the parts shown in Fig. 2 having been given identical numbers to the same parts in Fig. 1. The only parts appearing in Fig. 2 which are not shown or not identified in Fig. 1 are the third "toothpick" spring 16; the three nozzle exits 21, 22 and 23; and the spokes 24, 25 and 26 in the support means or bottom plate 10.

Lubricant may or may not be used as desired. In the case of the representative device shown in Figs. 1 and 2, lubricant may be wiped on the interior walls of the raceway 1, and/or the balls 19 and 20. Alternatively, the lubricant may be carried to within the device by the gas driving stream as, for example, in atomized form.

Various alterations in the structure may necessitate differences in manipulation of the apparatus. However, in the case of the embodiment shown in Figs. 1 and 2, the details of operation are as follows:

The top cover assembly comprising the cover 3, the inlet conduit 4, and the bottom plate or support means 10 is raised vertically and two or more balls, e. g., 19 and 20, are placed on the adjustable bottom plate 10. The top cover assembly is then lowered into place and the bottom plate 10 and the plane of the gas exit ports 21, 22 and 23 adjusted and set to desired levels by means of collets 12 and 13. Gas under pressure is fed into the nipple 9 from a valved source, not shown, to produce the desired angular acceleration, and thereafter the desired speed of rotation of the balls 19 and 20. The unit is allowed to run in this manner a desired time (as in a test to meet a specification) or until a marked uneven vibration is observed or detected by instruments indicating a test end-point. After the test, the balls 19 and 20 are removed, the parts cleaned and a new set of test balls, and/or a new level of bottom plate 10, and/or a new test raceway 1 is provided and the sequence of another test begun. The raceway may be composed of a plurality of superimposed ball bearing outer races, for example, and each race tested by adjusting the level of the bottom plate 10 and the gas outlet ports 21, 22 and 23.

The speeds, and consequently the contact pressures between the rolling elements and race, as well as the frequency of stress cycles obtainable with this device are immense for the relatively small size of the testing machine, i. e., 1 to 10 inches in diameter, more or less. Ball speeds about their axis up to 182,000 R. P. M., pressures up to 700,000 pounds per square inch, and stress frequencies on the order of 10 million per hour have been obtained. These pressures are due only to centrifugal force. Such high speeds and pressures in the absence of the normal cage frictional forces, unknown belt, shaft or housing loads, misalignment and deflection loads and other such imponderable but significant forces present in the usual testing machines, will provide a means for the very rapid determination of a few calculatable variables that influence the endurance characteristics of various materials.

The adaptability of this device to the testing of lubricants for film strength and other properties can be readily appreciated.

The number of tests required to determine the effect of a single variable is reduced appreciably since the number of uncontrolled significant variables is greatly reduced. The device also has great utility in that it is versatile, simple and inexpensive to operate.

The principle of operation of testing devices embodying the elements of this invention comprises effecting rapid revolution of the rolling elements, such as balls, about the surface of the raceway. The rolling elements are propelled by the gas stream and under equilibrium conditions, the rolling elements arrive at an equilibrium speed at a given pressure and space themselves in dynamic balance, i. e., two balls of equal weight will space themselves 180° apart; four balls of equal weight will space themselves 90° apart, etc. Best results are obtained when 2 or 4 balls are employed in a given test, although equilibrium conditions have been achieved with as many as 10 balls. Three balls of equal weight appear to rotate in a state of indifferent equilibrium although a set of one heavy and two light balls will rotate in stable equilibrium. It will also be seen that multiplying the number of balls multiplies the number of cycles to which the raceway is submitted. Thus, if the rolling elements are essentially of equal weight as they should be in the preferred case, there will be essentially no vibration in the device. It has also been noted that the rolling elements rotate about the raceway in a plane in the vicinity of the plane of the gas exits 21, 22, and 23. After the apparatus is put in operation, therefore, bottom plate 10 can be removed entirely as its principal function is to assist in starting the rolling elements at the proper level. Where gas jets of a type such as illustrated are employed, or super-sonic nozzles utilized, ultimate speeds of rotation may be selected which may reach immense values. The rolling elements roll about a given axis so that in a single test only one band of contact about the periphery of a ball occurs unless, of course, it is running in a formed track, e. g., a V-grooved track. The weight of the rolling elements and high angular velocity causes tremendous pressures to be exerted at the contact areas between rolling element and test race producing ideal conditions for determining rolling contact endurance phenomena. When the material of the rolling element or the test raceway has reached its limit of endurance, a small chip will fly out causing an unevenness in the test surface or a minute change in weight of the rolling element giving rise to unbalance and therefore a pronounced change in vibration in the device. This then, is the endurance limit of the material being tested. Although reference has been had to a test race and a rolling element, it will be appreciated that either the rolling element or the test race, such as a ball bearing outer race, may be undergoing test. Standard materials may, of course, be selected and used as a basis of comparison for other materials and specifications drawn for fatigue limits.

The following is an example of a test performed using a testing machine of this invention. Two 0.5000" test balls made of SAE 52100 steel and differing in weight by 0.0 milligram were used. The test cylinder had a diameter of 3.250" (I. D.). The device was provided with instrumentation to determine the number of revolutions, a tachometer, air pressure, and an automatic vibration shut-off control. The revolution totalizer showed a reading to start of $72378 \times 10^4$, and at the end of the test, a reading of $87859 \times 10^4$, giving a total number of revolutions of 154,810,000. The total time of the test was 48 hours and 50 minutes. The table below tabulates the data.

Table

| Time | R. P. M. | Counter Reading, ×10⁴ | Air Pressure, p. s. i. | Vibration Reading | | Temperature in Device, °F. |
|---|---|---|---|---|---|---|
| | | | | Veloc., in./sec. | Displacement, mils | |
| 9:00 a. m. | Start | 72378 | 100 | 2.8 | 1.2 | 86 |
| 10:00 a. m. | 26,300 | 72693 | 101 | 2.8 | 1.2 | 87 |
| 11:00 a. m. | 26,250 | 73010 | 100 | 2.9 | 1.1 | 87 |
| 12:00 n. | 26,300 | 73332 | 101 | 2.8 | 1.2 | 87 |
| 3:00 a. m. | 26,850 | 74290 | 100 | 3.0 | 1.2 | 88 |
| 5:00 a. m. | 26,750 | 74920 | 100 | 2.9 | 1.3 | 89 |
| 8:00 a. m. | 26,000 | 75890 | 101 | 2.6 | 1.2 | 87 |
| 11:00 p. m. | 26,650 | 76850 | 101 | 2.8 | 1.1 | 86 |
| 9:00 a. m. | 26,000 | 80001 | 99 | 2.7 | 1.2 | 86 |
| 12:00 n. | 26,300 | 80973 | 100 | 2.8 | 1.1 | 88 |
| 5:00 p. m. | 26,250 | 82546 | 99 | 2.6 | 1.1 | 89 |
| 8:00 p. m. | 26,200 | 83506 | 99 | 2.7 | 1.2 | 87 |
| 11:00 p. m. | 26,900 | 84451 | 101 | 2.8 | 1.1 | 86 |
| 9:00 a. m. | 26,000 | 87562 | 100 | 2.7 | 1.2 | 85 |
| 9:50 a. m. | Stopped | 87859 | | | | |

Examination of the device after automatic shut-off due to sharp vibration showed that one of the balls had a fatigue mark in the ball track, but the race and the other ball were apparently all right.

From the speed, the load may be calculated and then the theoretical contact stress and its distribution over the contact volume. From the total number of revolutions, the total number of stress cycles on the cylinder contact volume is calculated; and the total number of stress cycles on the ball contact volume is a constant times the above value depending upon the ratio of the diameters of the cylinder and the ball. This calculates out to 503,000,000 ball stress cycles in this case.

While elaborate and automatic instrumentation may be employed with the testing devices of this invention, results may be obtained with simpler measuring devices such as a strobotach to determined speed, a timer to calculate revolutions, etc. The vibration at the end-point will be noticeable.

Various modifications of the device shown may be made without departing from the essence of the invention. For example, various shapes of the inner test walls (otherwise identified as the raceway) may be used to introduce certain variables; e. g., elliptical, or grooved, or provided with certain peripheral irregularities. Also, different size balls can be used. Thus, a system of two small balls of the same weight and one large ball of a different weight may be brought into dynamic equilibrium within a device of this invention to test the effect of superimposed loads of various magnitudes. Glass, Lucite or other non-metallic materials may be tested as the rolling elements or as the raceway.

The devices of this invention are useful in studying the effect of various factors on fatigue, such as heat treatments, grinding, fabrication techniques, etc. By providing the inner wall of the raceway with a V-groove, the effect of angular contact may be investigated. Inert gas atmosphere, corrosive gas, or gases at various temperatures may be used to determine the effect of these upon the fatigue and rolling characteristics. The test balls may be run at various degrees of unbalance, e. g., different weights, to examine the effect of this variable in high speed operation.

Other modes of applying the principles of this invention may be employed instead of those specifically set forth above change being made as regards the details herein disclosed, provided the elements set forth in any of the following claims, or the equivalent of such be employed.

I, therefore, particularly point out and distinctly claim as my invention:

1. A testing device comprising a closed raceway resiliently mounted on a base, a plurality of rolling elements disposed within said raceway, a plurality of nozzles located centrally of said raceway and supplied by fluid feeding and pressurizing means for propelling said rolling elements in rolling contact with said raceway.

2. A testing device comprising a closed raceway resiliently mounted on a base, a plurality of balls disposed within said raceway, a plurality of nozzles located centrally of said raceway and supplied by fluid feeding and pressurizing means for propelling said balls in peripherally spaced relationship and in rolling contact with said raceway, and support means for holding said balls within said raceway when at rest.

3. A testing device comprising a circular raceway resiliently mounted on a base, from 2 to 4 balls disposed within said raceway, a plurality of nozzles located centrally of said raceway supplied by fluid feeding and pressurizing means for propelling said balls in circumferentially spaced relationship and in rolling contact with said raceway, said nozzles formed to direct streams of gaseous fluid outwardly toward said raceway in a non-radial direction, and a support for holding said balls within said raceway when at rest.

4. A testing device comprising a circular raceway resiliently mounted on a base, from 2 to 4 balls disposed within said raceway, a cover for the upper portion of said raceway having through a central portion thereof a conduit terminating at its lower end in a plurality of nozzles located centrally of said raceway and formed to direct streams of gaseous fluid outwardly toward said raceway in a non-radial direction, fluid feeding and pressurizing means connecting with said conduit for propelling said balls in circumferentially spaced relationship and in rolling contact with said raceway, and support means for holding said balls within said raceway when at rest.

5. A testing device comprising a circular raceway resiliently mounted on a base, at least 2 balls of substantially equal weight disposed within said raceway, a cover for the upper portion of said raceway having through a central portion thereof a conduit terminating at its lower end in a manifold from which depend a plurality of nozzles, the exits of which are in a substantially horizontal plane at points substantially equidistant from the center of the raceway and formed to direct a plurality of jets of gaseous fluid at high speed outwardly from the center in a non-radial direction, gaseous fluid feeding and pressurizing means connecting with said conduit for propelling said balls in circumferentially spaced relationship and in rolling contact with said raceway, a support for holding said balls within said raceway when at rest, and an exit below said raceway to permit escape of spent gaseous fluid.

6. A device in accordance with claim 5 in which the level of the substantially horizontal plane of the nozzles is adjustable to any level within the raceway.

7. A device in accordance with claim 5 in which the level of the substantially horizontal plane of the nozzles and the level of the support means are adjustable to any levels, respectively, within the raceway.

8. A testing device comprising a circular raceway resiliently mounted on a base, a plurality of rolling elements of substantially equal weight disposed within said raceway, a cover for the upper portion of aid raceway having through a central portion thereof a conduit terminating at it lower end in a manifold from which depend a plurality of nozzles, the exits of which are in a substantially horizontal plane at points substantially equidistant from the center of the raceway and formed to direct jets of gaseous fluid at high speed outwardly from the center in a horizontal substantially tangential direction, gaseous fluid feeding and pressurizing means connecting with said conduit for propelling said rolling elements in circumferentially spaced relationship and in rolling contact with said raceway, a support for holding said rolling elements within said raceway when at rest, and an exit from the device to permit the escape of spent gaseous fluid.

References Cited in the file of this patent

UNITED STATES PATENTS

| | | |
|---|---|---|
| 818,566 | Scotti | Apr. 24, 1906 |
| 2,333,040 | Pope | Oct. 26, 1943 |
| 2,518,149 | Kearsley | Aug. 8, 1950 |